United States Patent
Nakai (10) Patent No.: US 11,273,774 B2
(45) Date of Patent: Mar. 15, 2022

(54) WIRE HARNESS WITH SHORT-LONG SIDES OVERLAPPING FLAT WIRES

(71) Applicant: SUMITOMO WIRING SYSTEMS, LTD., Yokkaichi (JP)

(72) Inventor: Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/973,607

(22) PCT Filed: Jun. 18, 2019

(86) PCT No.: PCT/JP2019/024018
§ 371 (c)(1),
(2) Date: Dec. 9, 2020

(87) PCT Pub. No.: WO2020/004128
PCT Pub. Date: Jan. 2, 2020

(65) Prior Publication Data
US 2021/0245685 A1    Aug. 12, 2021

(30) Foreign Application Priority Data

Jun. 26, 2018    (JP) .............................. JP2018-121204

(51) Int. Cl.
   *B60R 16/02*    (2006.01)
   *H01B 7/00*    (2006.01)
(52) U.S. Cl.
   CPC ....... *B60R 16/0215* (2013.01); *H01B 7/0045* (2013.01)

(58) Field of Classification Search
None
See application file for complete search history.

(56) References Cited

U.S. PATENT DOCUMENTS

| 4,660,125 A | * | 4/1987 | Purdy | ................. | H01B 7/0045 |
| | | | | | 361/727 |
| 9,666,955 B2 | | 5/2017 | Sugino | | |
| 2007/0087620 A1 | * | 4/2007 | Yamamoto | ............. | H02G 11/00 |
| | | | | | 439/422 |

(Continued)

FOREIGN PATENT DOCUMENTS

| CN | 109065223 A | * | 12/2018 | | |
| CN | 109790945 A | * | 5/2019 | ......... | B60R 16/0215 |
| DE | 19650227 C1 | * | 11/1997 | ............ | B60J 7/0573 |

(Continued)

OTHER PUBLICATIONS

Aug. 6, 2019 Search Report issued in International Patent Application No. PCT/JP2019/024018.

*Primary Examiner* — Timothy J. Dole
*Assistant Examiner* — Muhammed Azam
(74) *Attorney, Agent, or Firm* — Oliff PLC (57) ABSTRACT

A wire harness, including: a first wire including a first core wire and a second wire including a second core wire, the first core wire and the second core wire being joined together, wherein the first core wire includes a first flat surface extending along an entire length of the first core wire in a length direction, the second core wire includes a second flat surface extending along an entire length of the second core wire in a length direction, and the first flat surface and the second flat surface are overlapped and joined.

7 Claims, 5 Drawing Sheets

(56) References Cited

U.S. PATENT DOCUMENTS

2019/0244728 A1* 8/2019 Takata ................ B60R 16/0215

FOREIGN PATENT DOCUMENTS

| | | | | | |
|---|---|---|---|---|---|
| DE | 19721452 | A1 | * | 11/1997 | ......... B60R 16/0215 |
| DE | 19724966 | A1 | * | 12/1998 | ......... B60R 16/0215 |
| DE | 19923469 | A1 | * | 12/2000 | ........... H01B 7/0045 |
| DE | 10037263 | A1 | * | 2/2001 | ............... B60Q 3/51 |
| DE | 20211568 | U1 | * | 11/2002 | ............. F16L 3/233 |
| DE | 10253145 | A1 | * | 5/2004 | ......... B60R 16/0215 |
| DE | 102007020913 | A1 | * | 11/2008 | ......... B60R 16/0215 |
| DE | 102012214161 | A1 | * | 2/2014 | ......... B60R 16/0215 |
| DE | 102014007886 | A1 | * | 10/2014 | ......... B60R 16/0215 |
| DE | 102015214109 | A1 | * | 2/2017 | ......... B60R 16/0215 |
| EP | 0310957 | A2 | * | 4/1989 | ........... H01B 7/0838 |
| EP | 1701362 | A2 | * | 9/2006 | ........... H01B 7/0892 |
| EP | 2451037 | A2 | * | 5/2012 | ............... H02G 1/14 |
| JP | S56-069780 | A | | 6/1981 | |
| JP | S57-105906 | A | | 7/1982 | |
| JP | S59-4174 | U | | 1/1984 | |
| JP | 09260005 | A | * | 10/1997 | ........... H01R 12/772 |
| JP | 2003259535 | A | * | 9/2003 | ......... B60R 16/0215 |
| JP | 2018207605 | A | * | 12/2018 | ....... H01B 13/01209 |
| KR | 100587224 | B1 | * | 6/2006 | |
| KR | 20090086901 | A | * | 8/2009 | ........... H02G 3/0468 |
| KR | 20110072648 | A | | 6/2011 | |
| KR | 200478422 | Y1 | * | 10/2015 | |
| WO | WO-9928161 | A1 | * | 6/1999 | ............ H05K 1/0284 |
| WO | WO-2005034146 | A1 | * | 4/2005 | ............ H05K 1/118 |
| WO | WO-2009016953 | A1 | * | 2/2009 | ........... H02G 3/0468 |
| WO | WO-2013061846 | A1 | * | 5/2013 | ........... H01M 10/625 |
| WO | WO-2014175204 | A1 | * | 10/2014 | ......... B60R 16/0215 |
| WO | WO-2017171024 | A1 | * | 10/2017 | ............. B60R 16/02 |
| WO | WO-2018131483 | A1 | * | 7/2018 | ................ H01R 4/58 |
| WO | WO-2019225030 | A1 | * | 11/2019 | ............... H02G 3/30 |
| WO | WO-2020004128 | A1 | * | 1/2020 | ............... H01B 7/00 |
| WO | WO-2020090398 | A1 | * | 5/2020 | ............... H01B 7/04 |

* cited by examiner

WIRE HARNESS WITH SHORT-LONG SIDES OVERLAPPING FLAT WIRES

BACKGROUND

The present disclosure relates to a wire harness.

An example of a known wire harness routed in a vehicle is a wire harness including a plurality of wires, with core wires of these wires being joined together (for example, see JP 2016-58137A). This kind of wire harness includes a stranded wire with a plurality of individual wire strands twisted together as the core wire and a solid core wire with a single core wire with a circular cross-section. An end portion of a stranded wire is provided with an individual wire exposed portion where the individual wires are exposed. An end portion of a solid core wire is provided with a conductor exposed portion where the single core wire is exposed. The conductor exposed portion is provided with a collapsed portion, and the individual wire exposed portion is joined to a planar portion of the collapsed portion via ultrasonic welding.

SUMMARY

However, in the wire harness described above, as the core wires of a plurality of wires are joined together, a process of collapsing the conductor exposed portion of the solid core wire is necessary. In this process, to ensure that the join portion between the core wires is not distorted, the conductor exposed portion needs to be formed in a predetermined shape with high accuracy. This tends to make the forming process complicated, leaving room for improvement in easily manufacturing a wire harness.

An exemplary aspect of the disclosure provides a wire harness in which core wires are able to be easily joined together.

A wire harness according to an exemplary aspect includes a first wire including a first core wire and a second wire including a second core wire, the first core wire and the second core wire being joined together, wherein the first core wire includes a first flat surface extending along an entire length of the first core wire in a length direction; the second core wire includes a second flat surface extending along an entire length of the second core wire in a length direction; and the first flat surface and the second flat surface are overlapped and joined.

According to the present disclosure, core wires can be easily joined together.

DETAILED DESCRIPTION OF EMBODIMENTS

Embodiments will be described below with reference to the attached drawings. Note that in the attached drawings, components of the configuration may be exaggerated or simplified for the sake of convenience. Also, the dimensions and proportions of the components may differ from actual values.

First Embodiment

A wire harness according to a first embodiment will be described below with reference to FIGS. 1 and 2.

Figure 1:
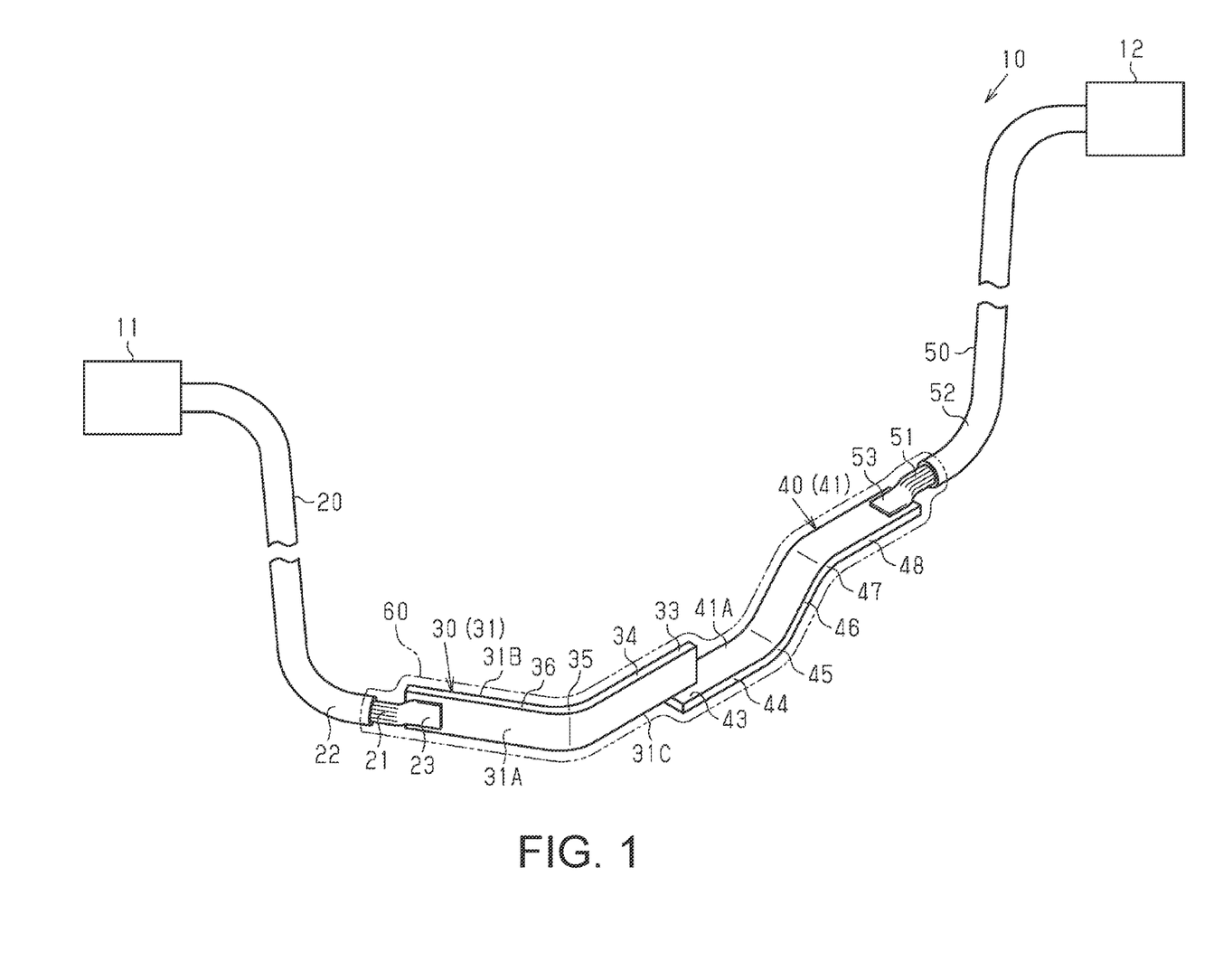
FIG. 1 is a schematic configuration diagram of a wire harness according to a first embodiment.

A wire harness 10 illustrated in FIG. 1, electrically connects two or three or more electric devices (devices). The wire harness 10, for example, electrically connects an inverter 11 installed in a front portion of a vehicle, such as a hybrid vehicle or an electric vehicle, and a high voltage battery 12 installed further to the rear of the vehicle than the inverter 11. The wire harness 10 is routed, for example, under the floor of the vehicle. The inverter 11 is connected to a motor (not illustrated) for driving a wheel which acts as the power source for driving the vehicle. The inverter 11 generates an alternating current from the direct current of the high voltage battery 12 and supplies the alternating current to the motor. The high voltage battery 12, for example, is a battery capable of supplying voltage of hundreds of volts.

The wire harness 10 includes a flexible wire 20 including one end connected to the inverter 11, a flat wire 30 including one end joined to the other end of the flexible wire 20, a flat wire 40 including one end joined to the other end of the flat wire 30, and a flexible wire 50 including one end joined to the other end of the flat wire 40 and the other end connected to the high voltage battery 12. The wire harness 10 is formed by the different wires, the flexible wire 20, the flat wire 30, the flat wire 40, and the flexible wire 50, being electrically connected in the length direction of the wire harness 10.

The flexible wires 20, 50 have excellent flexibility compared to the flat wires 30, 40. The flexible wires 20, 50 have excellent pliability compared to the flat wires 30, 40. Also, the flexible wires 20, 50 have higher bendability than the flat wires 30, 40.

The flexible wire 20 includes a core wire 21 made of a conductor and an insulating covering 22 that covers the outer circumference of the core wire 21. The flexible wire 50 includes a core wire 51 made of a conductor and an insulating covering 52 that covers the outer circumference of the core wire 51. As the core wires 21, 51, for example, a stranded wire including a plurality of individual metal wires twisted together or a braided member including a plurality of individual metal wires braided in a cylindrical shape may be used. A metal material, such as a copper-based material or an aluminum-based material may be used as the material of the core wires 21, 51, for example. A terminal (not illustrated) for connecting to the inverter 11 or the high voltage battery 12 is connected to the core wires 21, 51.

The insulating covering 22, for example, entirely covers the outer circumferential surface of the core wire 21 in an adhered state. The insulating covering 52, for example, entirely covers the outer circumferential surface of the core wire 51 in an adhered state. The insulating coverings 22, 52, for example, are formed by a synthetic resin insulating material or the like. The insulating coverings 22, 52, for example, may be formed on the core wires 21, 51 via extrusion molding (extrusion coating).

The flat wires 30, 40 have enough rigidity to enable the flat wires 30, 40 to maintain shape along the routing path of the wire harness 10. For example, the flat wires 30, 40 have enough rigidity to prevent vehicle vibrations or the like from undoing the linear or bend state given to the flat wires 30, 40 when installed in the vehicle. The flat wire 30 includes a core wire 31 made of a conductor. The flat wire 40 includes a core wire 41 made of a conductor. As the core wires 31, 41, for example, a flat single core wire made of a single metal rod with a prism-like shape (rectangular parallelepiped-like shape) and a solid inner structure may be used. The core wires 31, 41 are formed long in length.

The core wires 31, 41 are each flat plate members formed extending in the length direction (axis line direction) and extending in the width direction orthogonal to the length direction with a predetermined thickness in the thickness direction orthogonal to the length direction and the width direction. The cross-sectional shape of the core wires 31, 41 orthogonal to the length direction (in other words, the cross-sectional shape of the core wires 31, 41 sectioned along a plane orthogonal to the length direction of the core wires 31, 41) is formed in a flat shape, for example. In the present specification, "flat shape" includes in its meaning a rectangle and an ellipse, for example. Also, "rectangle" in the present specification refers to a shape with a long side and a short side, with a square being excluded from its meaning. Furthermore, "rectangle" in the present specification includes in its meaning a shape with a chamfered edge portion and a shape with a rounded edge portion.

Figure 2A:
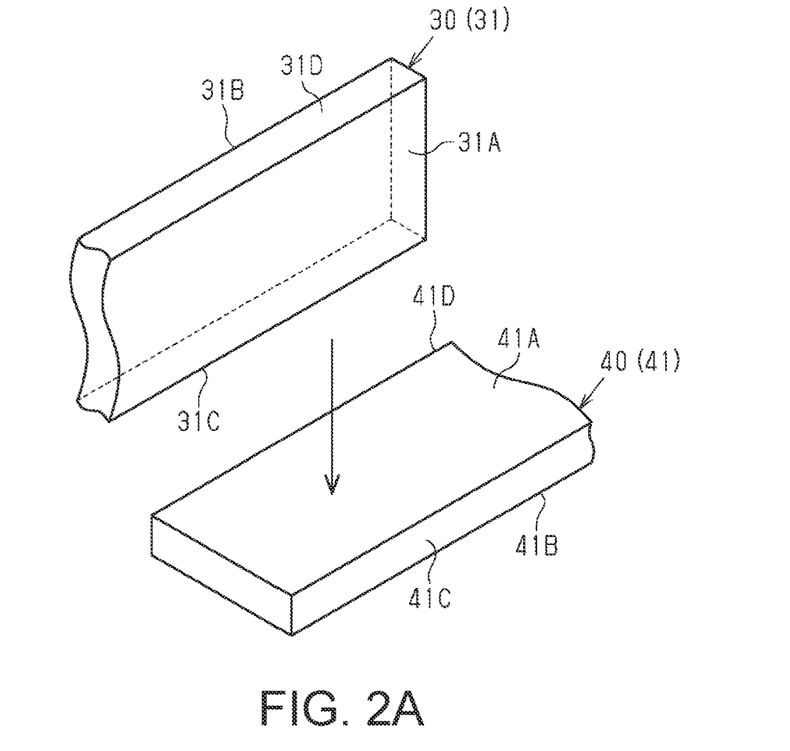
FIGS. 2(a) and 2(b) are schematic perspective views illustrating the wire harness according to the first embodiment.

As illustrated in FIG. 2(*a*), the cross-sectional shape of the core wires 31, 41 of the present embodiment orthogonal to the length direction (in other words, the shape of the cross-section of the core wires 31, 41 in the width direction) is formed as a rectangle. The cross-sectional shape of the core wires 31, 41 orthogonal to the length direction is formed as a rectangle unchanged along the entire length of the core wires 31, 41 in the length direction. The core wire 31 includes four flat surface portions, a pair of long side surfaces 31A, 31B including the long sides of the rectangle and a pair of short side surfaces 31C, 31D including the short sides of the rectangle. The pair of long side surfaces 31A, 31B and the pair of short side surfaces 31C, 31D are formed extending along the entire length of the core wire 31 in the length direction. The long side surfaces 31A, 31B have a greater surface area per unit length of the core wire 31 than the short side surfaces 31C, 31D. In a similar manner, the core wire 41 includes four flat surface portions, a pair of long side surfaces 41A, 41B including the long sides of the rectangle and a pair of short side surfaces 41C, 41D including the short sides of the rectangle. The pair of long side surfaces 41A, 41B and the pair of short side surfaces 41C, 41D are formed extending along the entire length of the core wire 41 in the length direction. The long side surfaces 41A, 41B have a greater surface area per unit length of the core wire 41 than the short side surfaces 41C, 41D. A metal material, such as a copper-based material or an aluminum-based material may be used as the material of the core wires 31, 41, for example.

Next, a joining mode of the flat wire 30 and the flat wire 40 will be described.

Figure 2B:
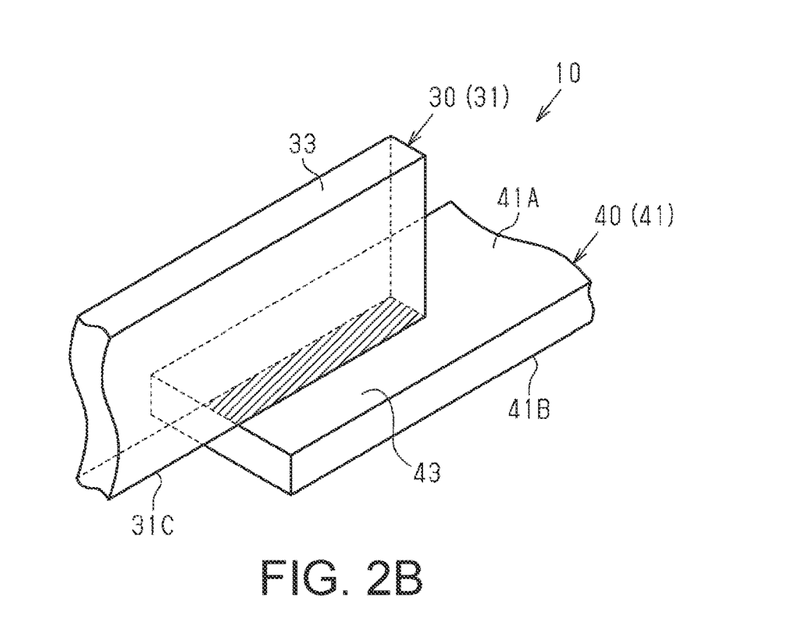

As illustrated in FIG. 2(*b*), an end portion 33 of the core wire 31 and an end portion 43 of the core wire 41 are overlapped and joined together. The short side surface 31C at the end portion 33 and the long side surface 41A at the end portion 43 are overlapped and joined together. Specifically, the end portion 33 and the end portion 43 are overlapped and joined, with the short side surface 31C at the end portion 33 coming into contact with the long side surface 41A on the long side surface 41A at the end portion 43. In this way, the long side surface 41A of the core wire 41 and the short side surface 31C of the core wire 31 are joined, and the core wire 31 and the core wire 41 are electrically connected. Here, the join area formed where the long side surface 41A of the core wire 41 and the short side surface 31C of the core wire 31 are joined (see the hatched region in the drawing), for example, is greater than or equal to the area of the cross-section orthogonal to the length direction of the core wire 31 (in other words, the cross-section in the width direction). For example, ultrasonic welding may be used as the method for joining the core wire 31 and the core wire 41. Here, ultrasonic welding is a method in which a resonator called a horn is brought into contact with a portion of the objects to be joined (the core wires 31, 41 in this example) and ultrasonic vibration is applied to the objects to be joined. The vibrational energy applied to the join interface of the objects to be joined welds the objects to be joined together using frictional heat generated at the join interface. For example, the resonator is brought into contact with the long side surface 41B on the opposite side from the long side surface 41A that is joined to the short side surface 31C of the core wire 31, and ultrasonic vibration is applied to the long side surface 41B.

As illustrated in FIG. 1, the flat wires 30, 40, for example, are bent in a three-dimensional manner when routed. The flat wires 30, 40, for example, are routed under the floor of the vehicle and are bent in a predetermined shape corresponding to the configuration under the floor. The flat wire 40 of the present embodiment includes a linear portion 44 extending in the vehicle longitudinal direction, a bent portion 45 provided at the end portion of the linear portion 44, an extension portion 46 extending upward with respect to the vehicle from the bent portion 45, a bent portion 47 provided at the end portion of the extension portion 46, and a linear portion 48 extending in the vehicle longitudinal direction from the bent portion 47. The linear portion 44 includes the end portion 43 to which the short side surface 31C of the core wire 31 is joined. The flat wire 30 of the present embodiment includes a linear portion 34 extending in the vehicle longitudinal direction, a bent portion 35 provided at the end portion of the linear portion 34, and an extension portion 36 extending in the vehicle longitudinal direction (to the rear of the plane of the paper in this example) from the bent portion 35. The linear portion 34 includes the end portion 33 to which the long side surface 41A of the core wire 41 is joined. The extension portion 36 is formed extending in a direction (the vehicle width direction) orthogonal to the direction the linear portions 34, 44, 48 extend (the vehicle longitudinal direction) and the direction the extension portion 46 extends (the vehicle vertical direction). In other words, the flat wire 30 and the flat wire 40 are formed bent in different directions. Specifically, the flat wire 40 bends from the linear portion 44 extending in the vehicle longitudinal direction and extends in the vehicle vertical direction. The flat wire 30 bends from the linear portion 34 extending in the vehicle longitudinal direction and extends in the vehicle width direction. In this way, the flat wires 30, 40 bends in a three-dimensional manner, extending in three directions, the vehicle longitudinal direction, the vehicle vertical direction, and the vehicle width direction.

Here, the bent portions 45, 47 are formed bending in the thickness direction (short side direction) of the core wire 41. The bent portions 45, 47 are formed bend partway along the long side surface 41A in the length direction, giving the core wire 41 a curved cross-section in the thickness direction. The bent portions 45, 47 are bent with a substantially uniform curvature along the entire length of the long side surface 41A in the width direction (long side direction). In other words, the bent portions 45, 47 are not portions where a kink is formed in the long side surface 41A. Here, the cross-section of the core wires 31, 41 in the thickness direction is a cross-section of the core wires 31, 41 sectioned along a plane extending parallel with the length direction of the core wires 31, 41 and extending in the thickness direction of the core wires 31, 41 (in other words, a cross-section parallel with the long side surfaces 31A, 31B, 41A, 41B).

The bent portion 35 is formed bending in the thickness direction (short side direction) of the core wire 31. The bent portion 35 is formed bend partway along the long side surface 31A in the length direction, giving the core wire 31 a curved cross-section in the thickness direction. The bent portion 35 is bent with a substantially uniform curvature along the entire length of the long side surface 31A in the width direction (long side direction). In other words, the bent portion 35 is not a portion where a kink is formed in the long side surface 31A.

Next, a joining mode of the core wire 21 of the flexible wire 20 and the core wire 31 of the flat wire 30 and a joining mode of the core wire 51 of the flexible wire 50 and the core wire 41 of the flat wire 40 will be described.

At the end portion of the flexible wire 20, an end portion 23 of the core wire 21 is exposed from the insulating covering 22. For example, the end portion 23 of the core wire 21 and the end portion of the long side surface 31A of the core wire 31 are overlapped and joined. The end portion 23 of the core wire 21 of the present embodiment and the long side surface 31A of the extension portion 36 of the core wire 31 are overlapped and joined. In this way, the core wire 21 and the core wire 31 are electrically connected. For example, ultrasonic welding may be used as the method for joining the core wire 21 and the core wire 31. The end portion 23 of the core wire 21 is flattened by being clamped together with the core wire 31 by a known jig (not illustrated) for ultrasonic welding. The individual wires of the core wire 21 are welded together at the end portion 23.

Also, at the end portion of the flexible wire 50, an end portion 53 of the core wire 51 is exposed from the insulating covering 52. For example, the end portion 53 of the core wire 51 and the end portion of the long side surface 41A of the core wire 41 are overlapped and joined. The end portion 53 of the core wire 51 of the present embodiment and the long side surface 41A of the linear portion 48 of the core wire 41 are overlapped and joined. In this way, the core wire 41 and the core wire 51 are electrically connected. For example, ultrasonic welding may be used as the method for joining the core wire 41 and the core wire 51, as in the method for joining the core wire 21 and the core wire 31.

Note that the process of joining the core wires 21, 31, 41, 51 and the order of the process of bending the core wires 31, 41 are not particularly limited. For example, after the process of joining the core wires 21, 31 and the process of joining the core wires 41, 51, the short side surface 31C of the core wire 31 joined to the core wire 21 and the long side surface 41A of the core wire 41 joined to the core wire 51 may be joined. Thereafter, the process of bending the core wires 31, 41 to form the bent portions 35, 45, 47 in the core wires 31, 41 may be performed. Alternatively, after the process of bending the core wires 31, 41, the process of joining the core wires 21, 31, 41, 51 may be performed.

The flat wires 30, 40, for example, are covered by an insulating member 60. The insulating member 60, for example, is formed covering the connection portion of the flat wire 30 and the flexible wire 20 and the connection portion of the flat wire 40 and the flexible wire 50. The insulating member 60, for example, is formed spanning between the insulating covering 22 of the flexible wire 20 and the insulating covering 52 of the flexible wire 50. One end portion of the insulating member 60 covers the outer circumferential surface of a terminal portion of the insulating covering 22, and the other end portion of the insulating member 60 covers the outer circumferential surface of a terminal portion of the insulating covering 52. The insulating member 60 ensures electrical insulation of the core wires 31, 41 and the core wires 21, 51 exposed from the insulating coverings 22, 52. As the insulating member 60, for example, a shrinkable tube, a rubber tuber, insulation tape, a synthetic resin hard protector, or a combination thereof may be used. A heat shrinkable tube may be used as the shrinkable tube, for example.

In the present embodiment, the flat wire 40 corresponds to a first wire, the core wire 41 corresponds to a first core wire, the long side surface 41A corresponds to a first flat surface portion, the flat wire 30 corresponds to a second wire, the core wire 31 corresponds to a second core wire, the short side surface 41C corresponds to a second flat surface portion.

Next, the effects of the present embodiment will be described.

(1) The core wire 41 of the flat wire 40 includes the long side surface 41A (flat surface portion) extending along the entire length in the length direction thereof, and the core wire 31 of the flat wire 30 includes the short side surface 31C (flat surface portion) extending along the entire length in the length direction thereof. Also, the long side surface 41A of the core wire 41 and the short side surface 31C of the core wire 31 are overlapped and joined.

With this configuration, the core wires 31, 41 have a structure in which the short side surface 31C and the long side surface 41A, both flat surface portions, are formed in advance. Thus, prior to the process of joining the core wire 31 and the core wire 41, a process of forming flat surface portions on the end portions of the core wires 31, 41 is not necessary. Thus, the wire harness 10 can be manufactured by simply joining together the core wires 31, 41 of the flat wires 30, 40.

(2) Also, by employing the core wires 31, 41 in which the short side surface 31C and the long side surface 41A, both flat surface portions, are formed in advance, the processing accuracy of the short side surface 31C and the long side surface 41A can be easily increased.

(3) The core wire 41 includes the long side surface 41A (flat surface portion) extending along the entire length of the length direction thereof. Thus, the core wire 31 can be joined at a discretionary position of the long side surface 41A. Also, the core wire 31 includes the short side surface 31C (flat surface portion) extending along the entire length of the length direction thereof. Thus, the core wire 41 can be joined at a discretionary position of the short side surface 31C. In this way, the position where the core wire 31 and the core wire 41 are joined can be easily changed, allowing a tolerance margin to be easily ensured.

(4) The cross-sectional shape of the core wires 31, 41 orthogonal to the length direction is formed as a rectangle. With this configuration, the rigidity of the core wires 31, 41 is relatively high in the long side direction (width direction) of the cross-sectional shape, i.e., rectangle, of the core wires 31, 41 orthogonal to the length direction, and the rigidity of the core wires 31, 41 is relatively low in the short side direction (thickness direction). This makes the process of bending the core wires 31, 41 in the short side direction easy.

(5) The core wire 31 and the core wire 41 are positioned overlapping and joined, with the short side surface 31C of the core wire 31 being brought into contact with the long side surface 41A of the core wire 41. With this configuration, not only can the long side surfaces 31A, 31B of the core wire 31 be used as join surfaces for joining the core wires 31, 41, but also the short side surfaces 31C, 31D of the core wire 31 can be used as join surfaces. In a similar manner, the short side surfaces 41C, 41D of the core wire 41 can also be used as join surface for joining the core wires 31, 41. In this way, the number of flat surfaces of the core wires 31, 41 that can be used as join surfaces is increased. This can increase the flexibility in terms of the routing path (layout) of the wire harness 10.

Also, because the short side surface 31C of the core wire 31 is joined to the long side surface 41A of the core wire 41, at the join portion, the short side direction of the core wire 31 and the short side direction of the core wire 41 can be offset by 90 degrees. This allows the direction in which the core wire 31 is easily bent and the direction in which the core wire 41 is easily bent to be offset by approximately 90 degrees. As a result, while using the flat plate-like flat wires 30, 40 with a determined easily bent direction, flexibility in terms of the routing path (layout) of the wire harness 10 can be increased.

(6) Also, because the easily bent direction of the core wire 31 and the easily bent direction of the core wire 41 can be offset by approximately 90 degrees, kinking in the core wires 31, 41 can be minimized or prevented. In this way, separation at the join portion between the core wires 31, 41 can be suitably minimized or prevented.

(7) The long side surface 41A and the short side surface 31C are joined in a manner with the join area between the long side surface 41A of the core wire 41 and the short side surface 31C of the core wire 31 being greater than or equal to the area of the cross-section of the core wires 31, 41 in the width direction. In this way, the connection reliability between the core wire 31 and the core wire 41 can be improved. Here, by adjusting the distance in the length direction of the core wire 31 joined to the long side surface 41A of the core wire 41, for example, the amount of join area between the long side surface 41A and the short side surface 31C can be easily adjusted.

(8) The long side surface 41A of the core wire 41 and the short side surface 31C of the core wire 31 are joined by ultrasonic welding. In this way, the contact resistance at the join portion where the long side surface 41A and the short side surface 31C are joined can be decreased.

(9) The end portions of the wire harness 10 preferably have excellent bendability to enable both end portions to be easily connected to the electric devices, such as the inverter 11 and the high voltage battery 12. Accordingly, in the wire harness 10, the flexible wire 20 is joined to the end portion of the flat wire 30 and the flexible wire 50 is joined to the end portion of the flat wire 40. The excellent pliability and flexibility of the flexible wires 20, 50 allow both end portions of the wire harness 10 to bend easily. Thus, connecting the wire harness 10 to the electric devices, such as the inverter 11 and the high voltage battery 12, can be performed easily.

Second Embodiment

Next, a wire harness according to a second embodiment will be described below with reference to FIG. 3. Note that in the present embodiment, mainly the differences with first embodiment will be described, and components similar to those in the first embodiment are given the same reference sign and the description of some or all thereof may be omitted.

Figure 3:
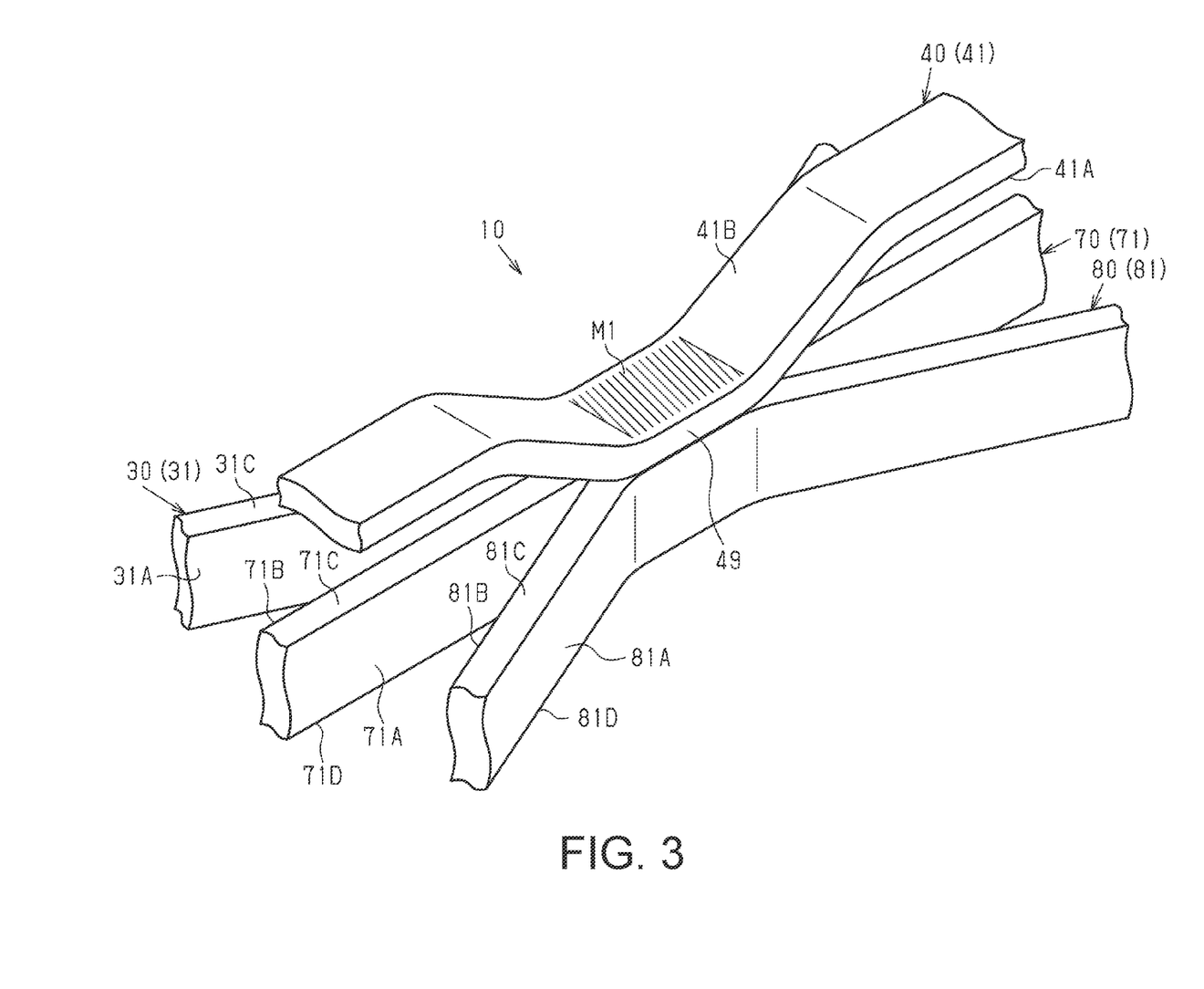
FIG. 3 is a schematic perspective view illustrating a wire harness according to a second embodiment.

As illustrated in FIG. 3, the wire harness 10 includes flat wires 70, 80 connected to electric devices (not illustrated) different from the inverter 11 and the high voltage battery 12 illustrated in FIG. 1. The flat wires 70, 80 are electrically connected to the flat wires 30, 40. For example, the flat wires 30, 70, 80 supply power supplied to the flat wire 40 to the various electric devices. For example, the flat wire 40 functions as a trunk wire, and the flat wires 30, 70, 80 functions as branch wires.

The flat wires 70, 80 have a similar configuration to the flat wires 30, 40 and include core wires 71, 81, respectively. The cross-sectional shape of the core wires 71, 81 orthogonal to the length direction is formed as a rectangle unchanged along the entire length of the core wires 71, 81 in the length direction. The core wire 71 includes four flat surface portions, a pair of long side surfaces 71A, 71B including the long sides of the rectangle and a pair of short side surfaces 71C, 71D including the short sides of the rectangle. In a similar manner, the core wire 81 includes four flat surface portions, a pair of long side surfaces 81A, 81B including the long sides of the rectangle and a pair of short side surfaces 81C, 81D including the short sides of the rectangle. A metal material, such as a copper-based material or an aluminum-based material may be used as the material of the core wires 71, 81, for example.

Next, a joining mode of the core wires 31, 41, 71, 81 of the flat wires 30, 40, 70, 80 will be described.

The plurality (three in this example) of core wires 31, 71, 81 are positioned overlapping and joined to the long side surface 41A at an intermediate portion 49 of the core wire 41 in the length direction. The core wires 31, 71, 81 are each positioned overlapping and joined to the long side surface 41A at the intermediate portion 49, with the short side surfaces 31C, 71C, 81C coming into contact with the long side surface 41A. In this way, the core wire 41 and the core wires 31, 71, 81 are electrically connected. In the present embodiment, the short side surfaces 31C, 71C, 81C at intermediate portions of the core wires 31, 71, 81 in the length direction are positioned overlapping and joined to the long side surface 41A at the intermediate portion 49. Note that the core wires 31, 71, 81 may be in contact with one another or not be in contact with one another at the intermediate portion 49.

The plurality of core wires 31, 71, 81 are disposed side by side in the width direction of the long side surface 41A on the long side surface 41A at the intermediate portion 49. The short side surfaces 31C, 71C, 81C of the plurality of core wires 31, 71, 81 are joined on a single long side surface 41A at the same position (the intermediate portion 49 in this example) in the length direction of the core wire 41. In this way, the core wire 41 and the core wires 31, 71, 81 can all be joined at a single section. This allows the core wire 41 and the core wires 31, 71, 81 to all be joined at one time (in other words, in a single joining process).

For example, ultrasonic welding may be used as the method for joining the core wires 31, 71, 81 and the core wire 41. In the present embodiment, the resonator is brought into contact with the long side surface 41B on the opposite side from the long side surface 41A that is joined to the short side surfaces 31C, 71C, 81C of the core wires 31, 71, 81 and ultrasonic vibration is applied to the long side surface 41B. Thus, a mark M1 (see the hatched region in the drawing)

indicating where the resonator came into contact and ultrasonic vibration was applied is formed on the long side surface 41B at the intermediate portion 49 of the core wire 41.

The plurality of core wires 31, 71, 81 are bent and extend in different directions, for example. Note that a flexible wire similar to the flexible wire 20, 50 may be connected to the end portions of the core wires 31, 41, 71, 81.

In the present embodiment, the flat wires 70, 80 correspond to a third wire, the core wires 71, 81 correspond to a third core wire, and the short side surfaces 71C, 81C correspond to a third flat surface portion.

The present embodiment described above can achieve the following effects in addition to the effects numbered (1) to (9) of the first embodiment.

(10) The plurality of short side surfaces 31C, 71C, 81C are each positioned overlapping and joined to the single long side surface 41A (flat surface portion). In this way, compared to a configuration in which only a single core wire can be joined to the single long side surface 41A, flexibility in terms of the routing path of the wire harness 10 can be increased.

(11) The plurality of flat wires 30, 70, 80 are disposed side by side in the width direction of the long side surface 41A on the long side surface 41A of the core wire 41. Also, the short side surfaces 31C, 71C, 81C of the plurality of core wires 31, 71, 81 are joined on the long side surface 41A at the same position in the length direction of the core wire 41. In this way, the core wire 41 and the core wire 31, the core wire 41 and the core wire 71, and the core wire 41 and the core wire 81 can all be joined at a single section. This allows the core wire 41 and the plurality of core wires 31, 71, 81 to all be joined at the same time (in other words, in a single joining process). As a result, the labor and time involved in manufacturing the wire harness 10 can be reduced.

(12) The short side surfaces 31C, 71C, 81C of the plurality of core wires 31, 71, 81 are joined on the long side surface 41A at the intermediate portion 49 of the core wire 41 in the length direction. In this way, for example, the core wires 31, 41, 71, 81 can be easily joined at the branch portion of the wire harness 10. This can increase the flexibility in terms of routing the wire harness 10.

(13) The resonator is brought into contact with the long side surface 41B on the opposite side from the long side surface 41A that is joined to the short side surfaces 31C, 71C, 81C and ultrasonic vibration is applied to the long side surface 41B. With this configuration, the long side surface 41B and the long side surface 41A on the opposite side from the long side surface 41B are formed as a flat surface, and the distances from the long side surface 41B to the join interfaces of the short side surfaces 31C, 71C, 81C are roughly equal. Thus, even in the case in which the length in the width direction is different between the long side surfaces 31A, 71A, 81A of the core wires 31, 71, 81, an equal amount of vibrational energy can be applied to each of the join interfaces between the long side surface 41A and the short side surfaces 31C, 71C, 81C. This allows the long side surface 41A and the short side surfaces 31C, 71C, 81C to be joined together in a stable manner.

OTHER EMBODIMENTS

The following modifications can be made to the embodiments described above. The embodiments described above and the following modified examples can be implemented in any combination within a technically consistent range.

In the second embodiment described above, the core wire 41 and the plurality of core wires 31, 71, 81 all shared the same join portion at a single section. However, no such limitation is intended. For example, the section where the core wire 41 and the core wire 31 are joined, the section where the core wire 41 and the core wire 71 are joined, and the section where the core wire 41 and the core wire 81 are joined may be provided at positions separated from one another in the length direction of the core wire 41.

In the embodiments described above, the join surfaces between the short side surfaces 31C, 71C, 81C of the core wires 31, 71, 81 and the long side surface 41A of the core wire 41 are formed extending in the length direction of the long side surface 41A. However, no such limitation is intended. For example, the join surfaces between the short side surfaces 31C, 71C, 81C of the core wires 31, 71, 81 and the long side surface 41A of the core wire 41 may be formed extending in the width direction of the long side surface 41A.

Figure 4:
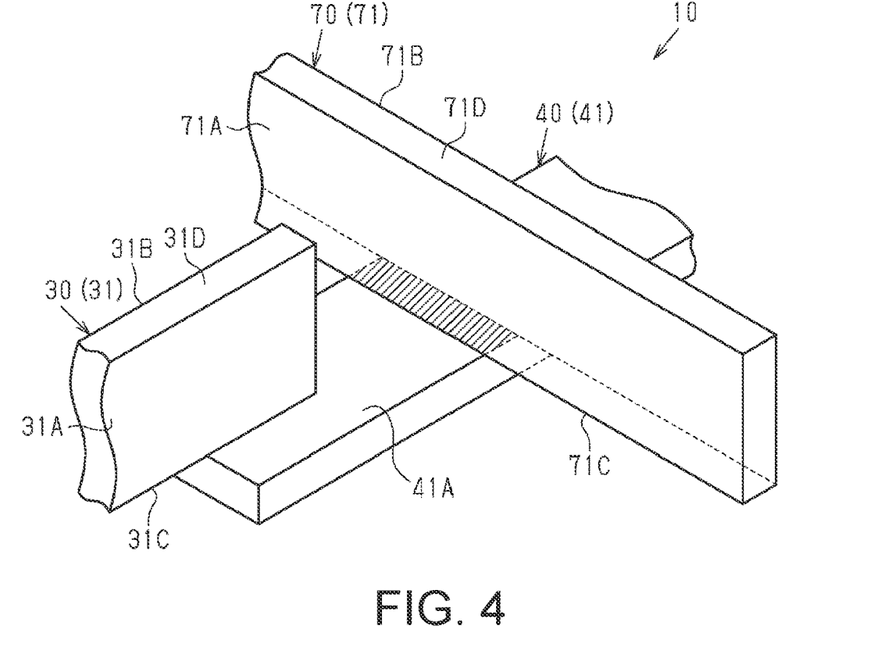
FIG. 4 is a schematic perspective view illustrating a wire harness according to a modified example.

For example, as illustrated in FIG. 4, the core wire 71 may be joined to the long side surface 41A of the core wire 41 with the core wire 71 traversing the long side surface 41A. For example, the short side surface 71C may be positioned overlapping and joined to the long side surface 41A of the core wire 41 with the length direction of the short side surface 71C of the core wire 71 intersecting the length direction of the long side surface 41A. In this example, the join surface (see the hatched region in the drawing) between the short side surface 71C of the core wire 71 and the long side surface 41A of the core wire 41 is formed extending in the width direction of the long side surface 41A. Because joining configurations such as this can be employed, the flexibility in terms of routing the wire harness 10 can be improved.

The flat wire 30 illustrated in FIG. 4 can be omitted from the wire harness 10.

Figure 5:
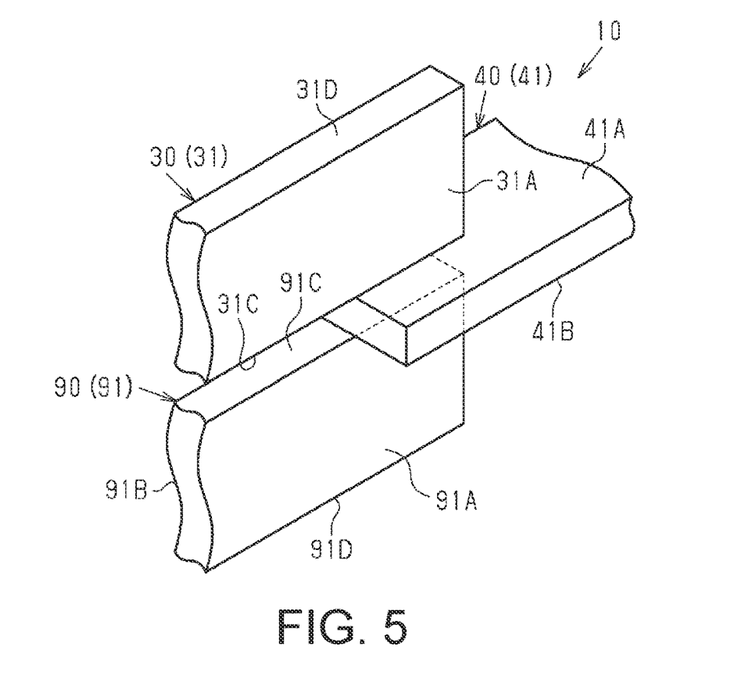
FIG. 5 is a schematic perspective view illustrating a wire harness according to a modified example.

As illustrated in FIG. 5, the flat wire 30 and a flat wire 90 may be joined to the pair of long side surfaces 41A, 41B (flat surface portions) of the core wire 41. The flat wire 90 is connected to an electric device (not illustrated) different from the inverter 11 and the high voltage battery 12 illustrated in FIG. 1, for example. The flat wire 90 has a similar configuration to the flat wires 30, 40 and include a core wire 91. The cross-sectional shape of the core wire 91 orthogonal to the length direction is formed as a rectangle unchanged along the entire length of the core wire 91 in the length direction. The core wire 91 includes four flat surface portions, a pair of long side surfaces 91A, 91B including the long sides of the rectangle and a pair of short side surfaces 91C, 91D including the short sides of the rectangle.

In the wire harness 10 illustrated in FIG. 5, the short side surface 31C of the core wire 31 and the long side surface 41A of the core wire 41 are overlapped and joined, and the short side surface 91C of the core wire 91 and the long side surface 41B of the core wire 41 are overlapped and joined. In this way, both the long side surface 41A and the long side surface 41B of the core wire 41 can be used as a join surface. This can increase the flexibility in terms of the routing path of the wire harness 10. Furthermore, in the present modified example, at the join portions of the core wires 31, 41, 91, the short side surface 31C of the core wire 31 and the short side surface 91C of the core wire 91 are disposed on either side of the core wire 41, sandwiching the core wire 41. In this way, the process of joining the core wires 31, 41 and the process of joining the core wires 41, 91 can be performed at the same time.

Note that, in the present modified example, the flat wire 90 corresponds to a fourth wire, the core wire 91 corresponds to a fourth core wire, the short side surface 91C corresponds to a fourth flat surface portion, and the long side surface 41B of the core wire 41 corresponds to a fifth flat surface portion.

In the wire harness 10 illustrated in FIG. 5, the join portion of the core wires 41, 91 and the join portion of the core wires 31, 41 may be provided at positions separated from one another in the length direction of the long side surface 41A. Also, the join portion of the core wires 41, 91 and the join portion of the core wires 31, 41 may be provided at positions separated from one another in the width direction of the long side surface 41A.

In the embodiments and the modified examples described above, the short side surfaces 31C, 41C, 71C, 81C, 91C of the core wires 31, 41, 71, 81, 91 are joined to the long side surface 41A of the core wire 41. However, no such limitation is intended. For example, all of the flat surface portions of the core wires 31, 41, 71, 81, 91 may be used as join surfaces.

Figure 6:
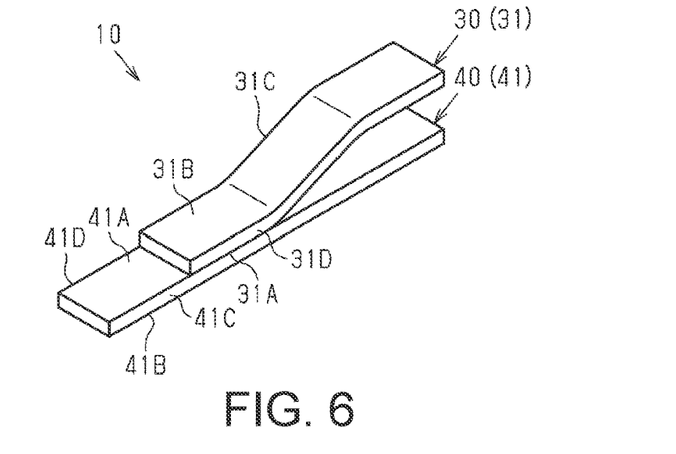
FIG. 6 is a schematic perspective view illustrating a wire harness according to a modified example.

For example, as illustrated in FIG. 6, the long side surface 31A of the core wire 31 and the long side surface 41A of the core wire 41 may be overlapped and joined.

Figure 7:
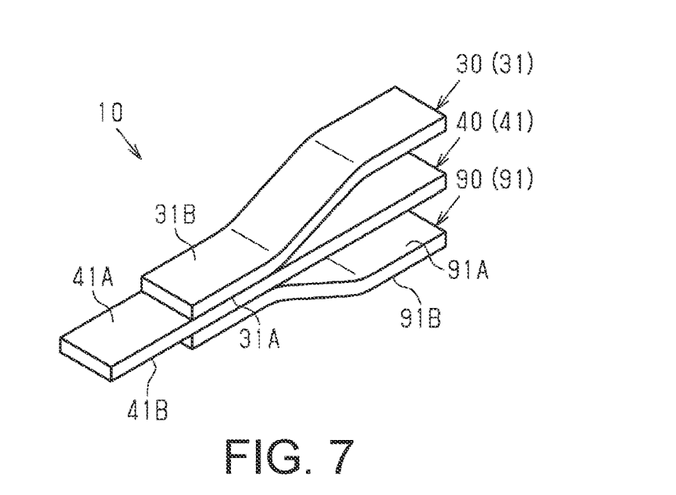
FIG. 7 is a schematic perspective view illustrating a wire harness according to a modified example.

In another example, as illustrated in FIG. 7, the long side surface 91A of the core wire 91 and the long side surface 41B of the core wire 41 may be overlapped and joined.

These configurations can achieve similar effects to the effects numbered (1) to (4) of the first embodiment.

The join positions of the core wires 31, 41, 71, 81, 91 in the embodiments and the modified examples described above may be set at discretionary positions in the length direction of the core wires 31, 41, 71, 81, 91.

A flexible wire similar to the flexible wire 20, 50 may be connected to the end portions of the core wires 31, 41, 71, 81, 91 of the modified examples described above.

A flexible wire may be joined to the short side surfaces 31C, 41C, 71C, 81C, 91C of the core wires 31, 41, 71, 81, 91 of the embodiments and the modified examples described above.

A flexible wire may be joined to an intermediate portion in the length direction of the core wires 31, 41, 71, 81, 91 of the embodiments and the modified examples described above.

Figure 8:
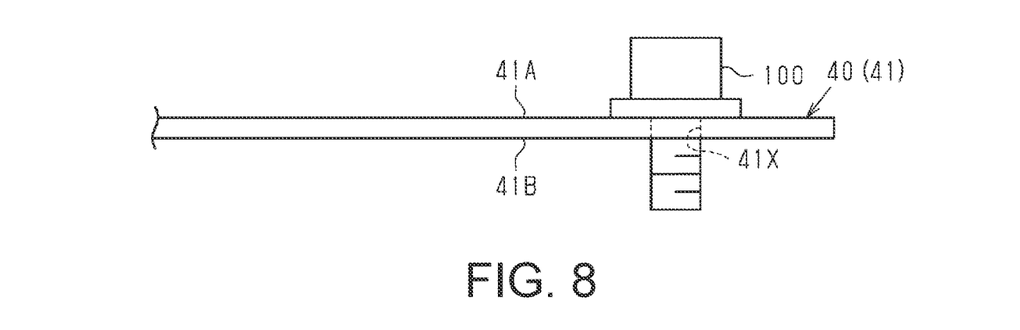
FIG. 8 is a schematic side view illustrating the wire harness according to the second embodiment.

As illustrated in FIG. 8, a through-hole 41X may be provided in the core wire 41 of the flat wire 40 extending through the core wire 41 in the thickness direction. In other words, the through-hole 41X may be provided in the core wire 41, the through-hole 41X extending through the core wire 41 from the long side surface 41A to the long side surface 41B. In this example, the flat wire 40 can be attached to an attachment target in the vehicle via a screw 100 inserted into the through-hole 41X. In this example, the end portion of the core wire 41 can function as a terminal for connecting to the electric device. Thus, the flexible wire 50 can be omitted. Also, the through-hole 41X may be provided in an intermediate portion of the core wire 41 in the length direction.

In a similar manner, a through-hole may be provided in the core wires 31, 71, 81, 91 extending through the core wires 31, 71, 81, 91 in the thickness direction.

The flat wire 30 of the embodiments and the modified examples described above may include, in a similar manner to the flexible wires 20, 50, an insulating covering that covers the periphery of the core wire 31. In this example, the insulating covering at the portion of the core wire 31 where the core wire 41 is joined and the portion of the core wire 31 where the core wire 21 is joined may be partially removed. Note that a similar modification can be applied to the flat wires 40, 70, 80, 90.

The cross-sectional shape of the core wires 31, 41, 71, 81, 91 orthogonal to the length direction of the embodiments and the modified examples described above is not limited to being a rectangle. For example, the core wires 31, 41, 71, 81, 91 are only required to include a flat surface portion extending along the entire length in the length direction, and the cross-sectional shape orthogonal to the length direction may be a square, a pentagon, an ellipse, or the like.

The method for joining the core wires together is not limited to ultrasonic welding, and other joining methods may be employed, such as soldering, resistance welding, laser welding, and the like.

Though not specifically mentioned in the embodiments described above, a configuration may be employed in which an outer sheath member that protects the flexible wires 20, 50 and the flat wires 30, 40 is provided. Also, a configuration may be employed in which an electromagnetic shield member is provided inside the outer sheath member. As the outer sheath member, a corrugated tube, a twist tube, a hard resin pipe, a metal pipe, or the like may be used. Also, for example, a composite pipe including a non-metal pipe body and an electrical conductive shield layer layered on or embedded in the non-metal pipe body may be employed. As the electromagnetic shield member, for example, a flexible braided wire or metal foil may be used.

The wire harness 10 of the embodiments described above is not limited to connecting together devices with high voltage such as the voltage and can be applied to a wide range of wire harnesses for connecting together two or more electric devices to be electrically connected.

The core wires 31, 41 of the illustrated embodiments are representative examples of the first and second electrical conductive metal flat plate. The core wires 31, 41 of the illustrated embodiments may include a first and second main surface, a first and second long side surface, and a first and second end surface. The long side surfaces 31A, 31B of the illustrated embodiments are representative examples of the main surfaces of the first electrical conductive metal flat plate. The long side surfaces 41A, 41B of the illustrated embodiments are representative examples of the main surfaces of the second electrical conductive metal flat plate. The short side surfaces 31C, 31D, 71C, 81C, 91C of the illustrated embodiments are representative examples of the first and second long side surfaces of the first electrical conductive metal flat plate. The two end surfaces in the longitudinal direction of the core wire of the flat wire of the illustrated embodiments are representative examples of the first and second end surfaces of the electrical conductive metal flat plate. In the first electrical conductive metal flat plate, an area from the first end surface to a selected distance (for example, an area with a length corresponding to the length of the flat join surface of the end portion 23 of the core wire 21) is referred to as a first end of the first electrical conductive metal flat plate. In the first electrical conductive metal flat plate, an area from the second end surface to a selected distance (for example, an area with a length corresponding to the length of the join surface between the first electrical conductive metal flat plate and the second electrical conductive metal flat plate, for example) is referred to as a second end of the first electrical conductive metal flat plate. In the second electrical conductive metal flat plate, an area from the first end surface to a selected distance (for example, an area with a length corresponding to the length of the join surface between the first electrical conductive metal flat plate and the second electrical conductive metal flat plate, for example) is referred to as a first end of the second electrical conductive metal flat plate. In the second electrical conductive metal flat plate, an area from the second end surface to a selected distance (for example, an area with a length corresponding to the length of the flat join surface of the end portion 53 of the core wire 51) is referred to as a second end of the second electrical conductive metal flat plate.

The present disclosure includes the following implementation examples. Representative constituent elements of exemplary embodiments are denoted with reference signs for the purpose of illustration and no limitation is intended.

Supplement 1

A wire harness (10) according to a non-limiting embodiment includes:

a first metal strand (21) including an end portion (23);

a second metal strand (51) including an end portion (53);

a first electrical conductive metal flat plate (31) including a first end surface, a second end surface on the opposite side to the first end surface in the longitudinal direction, and   a length defined by the first end surface and the second end surface;

a first main surface, a second main surface on the opposite side to the first main surface in the thickness direction, and   a constant thickness defined by the first main surface and the second main surface; and   a first long side surface,   a second long side surface on the opposite side to the first long side surface in the width direction, and   a constant width along the length defined by the first long side surface and the second long side surface; and a second electrical conductive metal flat plate (41) including   a first end surface,   a second end surface on the opposite side to the first end surface in the longitudinal direction, and   a length defined by the first end surface and the second end surface;

a first main surface, a second main surface on the opposite side to the first main surface in the thickness direction, and   a constant thickness defined by the first main surface and the second main surface; and   a first long side surface,   a second long side surface on the opposite side to the first long side surface in the width direction, and   a constant width along the length defined by the first long side surface and the second long side surface, wherein the end portion (23) of the first metal strand (21) is positioned overlapping the first main surface (31A) of the first metal strand (21) at or near the first end surface of the first electrical conductive metal flat plate (31) and electrically and mechanically connected to the first main surface (31A) of the first metal strand (21), the end portion (53) of the second metal strand (51) is positioned overlapping the first main surface (41A) of the second metal strand (51) at or near the second end surface of the second electrical conductive metal flat plate (41) and electrically and mechanically connected to the first main surface (41A) of the second metal strand (51), and a portion of the first long side surface of the first electrical conductive metal flat plate (31) and a portion of the first main surface of the second electrical conductive metal flat plate (41) are electrically and mechanically connected with the first main surface of the first main surface of the first electrical conductive metal flat plate (31) and the first main surface of the second electrical conductive metal flat plate (41) forming a T-shaped connection profile or an L-shaped connection profile.

Supplement 2

In a non-limiting implementation example, a first join surface, at the first long side surface of the first electrical conductive metal flat plate (31), extending a predetermined length from the second end surface of the first electrical conductive metal flat plate (31) can be electrically and mechanically connected to a second join surface, at the first main surface of the second electrical conductive metal flat plate (41), extending a predetermined length from the first end surface of the second electrical conductive metal flat plate (41).

Supplement 3

The first metal strand (21) and/or the second electrical conductive metal flat plate (41) may be a bent flat plate including at least one bent portion (35, 45, 47).

Supplement 4

The first join surface of the first metal strand (21) and the second join surface of the second electrical conductive metal flat plate (41) can be directly connected together by welding.

Supplement 5

The first join surface of the first metal strand (21) and the second join surface of the second electrical conductive metal flat plate (41) can be directly connected together by ultrasonic welding.

Supplement 6

The end portion (23) of the first metal strand (21) can have a maximum width less than the width of the first electrical conductive metal flat plate (31).

Supplement 7

The end portion (53) of the second metal strand (51) can have a maximum width less than the width of the second electrical conductive metal flat plate (41).

Supplement 8

The metal strands (21, 51) each include a non-end portion that excludes the end portions (23, 51), and the end portions (23, 53) of the metal strands (21, 51) may be flattened end portions thinner than the non-end portions of the metal strands (21, 51).

Supplement 9

A wire harness may be configured to be routed along a predetermined routing path including under a floor of a vehicle; and the first and second electrical conductive metal flat plates (31, 41) may be configured to maintain a shape compatible with the entire under floor path of the predetermined routing path or compatible with a predetermined portion of the under floor path of the predetermined routing path.

It should be apparent to those skilled in the art that the present disclosure may be embodied in many other specific forms without departing from the technical spirit or scope of the disclosure. For example, some of the components described in the embodiment (or one or more variations thereof) may be omitted, or some of the components may be combined. The scope of the present disclosure is defined with reference to the appended claims along with the full scope of equivalents to which the claims are entitled.

The invention claimed is:

1. A wire harness, comprising:

a first wire including a first core wire and a second wire including a second core wire, the first core wire and the second core wire being joined together, wherein:

the first core wire includes a first flat surface extending along an entire length of the first core wire in a length direction, the second core wire includes a second flat surface extending along an entire length of the second core wire in a length direction, the first flat surface and the second flat surface are overlapped and joined, a cross-sectional shape of the first core wire orthogonal to the length direction of the first core wire is a rectangle, and the first core wire includes a pair of long side surfaces including long sides of the rectangle and a pair of short side surfaces including short sides of the rectangle, a cross-sectional shape of the second core wire orthogonal to the length direction of the second core wire is a rectangle, and the second core wire includes a pair of long side surfaces including long sides of the rectangle and a pair of short side surfaces including short sides of the rectangle, and the first flat surface is one of the long side surfaces of the first core wire, and the second flat surface is one of the short side surfaces of the second core wire.

2. The wire harness according to claim 1, further comprising a third wire including a third core wire, wherein the third core wire includes a third flat surface extending along an entire length of the third core wire in a length direction, and the second flat surface and the third flat surface are each positioned overlapping and joined to the first flat surface.

3. The wire harness according to claim 2, wherein a cross-sectional shape of the third core wire orthogonal to the length direction of the third core wire is a rectangle, and the third core wire includes a pair of long side surfaces including long sides of the rectangle and a pair of short side surfaces including short sides of the rectangle, the third flat surface is one of the short side surfaces of the third core wire, the second wire and the third wire are disposed side by side in a width direction of the first flat surface on the first flat surface, and the second flat surface and the third flat surface are joined on the first flat surface at an identical position in the length direction of the first core wire.

4. The wire harness according to claim 1, further comprising a fourth wire including a fourth core wire, wherein the fourth core wire includes a fourth flat surface extending along an entire length of the fourth core wire in a length direction, the first core wire includes a fifth flat surface, different from the first flat surface, extending along the entire length of the first core wire in the length direction, and the fifth flat surface and the fourth flat surface are overlapped and joined.

5. The wire harness according to claim 1, wherein the second flat surface is joined to the first flat surface at an intermediate portion of the first core wire in the length direction.

6. The wire harness according to claim 1, wherein the first flat surface and the second flat surface are joined by ultrasonic welding.

7. The wire harness according to claim 1, further comprising a flexible wire including a core wire with greater flexibility than the first core wire, wherein an end of the core wire of the flexible wire and the first flat surface are overlapped and joined.

* * * * *